United States Patent [19]

Luo

[11] Patent Number: 4,848,279
[45] Date of Patent: Jul. 18, 1989

[54] AIR-INJECTION DEVICE FOR TWO-STROKE ENGINES

[75] Inventor: Jih-Tzang Luo, Hsin Chu Hsien, Taiwan

[73] Assignee: Industrial Technology Research Institute, Hsin Chu Hsien, Taiwan

[21] Appl. No.: 151,991

[22] Filed: Feb. 3, 1988

[51] Int. Cl.$^4$ .............................................. F02B 39/00
[52] U.S. Cl. ................... 123/26; 123/73 V; 60/314
[58] Field of Search .................. 123/26, 65 BA, 73 V, 123/73 PP, 73 B, 73 C, 73 R, 65 PE, 65 PD, 73 S; 60/314, 324

[56] References Cited

U.S. PATENT DOCUMENTS

| | | | |
|---|---|---|---|
| 1,130,419 | 3/1915 | Miller | 60/314 |
| 1,804,321 | 5/1931 | Crowe | 60/314 |
| 2,131,957 | 10/1938 | Kadenacy | 60/314 |
| 4,191,141 | 3/1980 | Franke | 123/73 R |
| 4,318,373 | 3/1982 | Soubis | 123/73 AC |

*Primary Examiner*—David A. Okonsky
*Attorney, Agent, or Firm*—Cushman, Darby & Cushman

[57] ABSTRACT

A round pipe being rotatably mounted in a round hole seat adjacent to the exhausting port on the cylinder block of a two-stroke engine; the round hole seat has two passages being in communication with the exhausting port and the crankcase. The round pipe has a slot, which can align with the aforesaid two passages respectively upon the round pipe rotating so as to have the round pipe become communicating with the exhausting port or the crankcase; the time of that communicating state is synchronous with the later period of exhausting and the ending of intake into the crankcase. The inside of the round pipe is fed with compressed air, therefore, the compressed air blowing towards the exhausting port during the later period of exhausting forms a screen to prevent the fresh gas from flowing out together with the waste gas exhausted or even reversely inject air into the cylinder for increasing the gas pressure in the cylinder. Upon the ending of gas feeding into the crankcase, additional air is injected therein to increase the pressure in the crankcase. By means of the aforesaid air screen and pressure increasing method, advantages, such as reducing fuel lost, to elevate the combustion efficiency and to lower the pollution caused by exhausted gas, can be obtained.

2 Claims, 4 Drawing Sheets

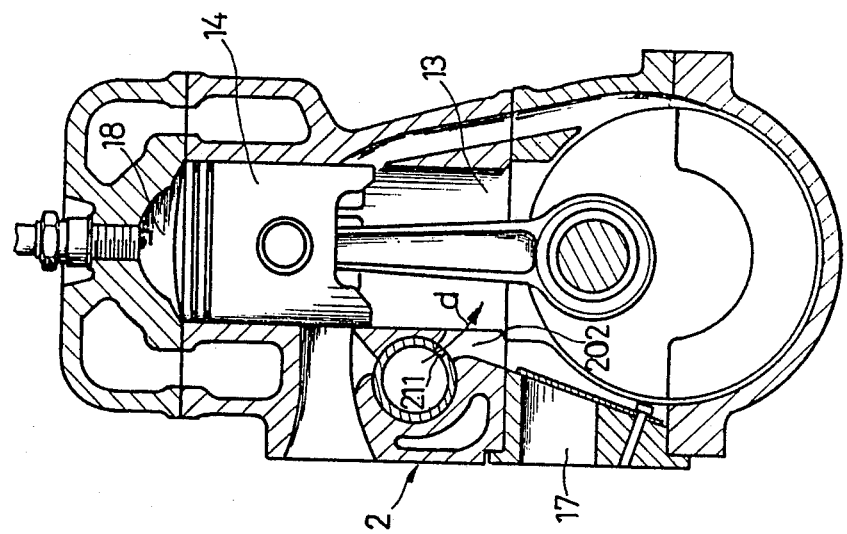
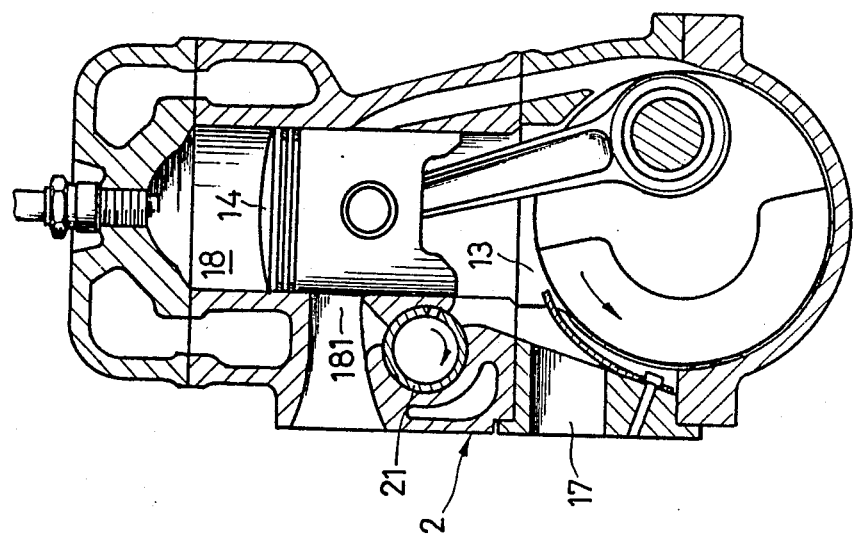

AIR-INJECTION DEVICE FOR TWO-STROKE ENGINES

BACKGROUND OF THE INVENTION

It is well known that a two-stroke engine has the advantages of a simple structure, lower manufacturing cost, being easy to repair, and a steady power output; however, its drawbacks are the higher consumption of fuel and the higher pollution caused by exhausted waste gas. The aforesaid drawbacks have become rather serious problems under the tendency pressure of saving energy and environment protection.

The aforesaid drawbacks of higher fuel consumption and pollution are mainly caused by part of the pre-mixed fuel gas to be exhausted together with the waste gas during the scavenging stage in the engine; the volume of the pre-mixed fuel gas exhausted generally reaches ranging from 25% to 40%.

Conventionally, the method of preventing the fresh gas from being exhausted during exhausting stroke is to properly design the length of the exhausting pipe, the length of the divergent cone and the convergent cone so as to let the divergent cone and the convergent cone cause the exhausted wate gas to generate negative pressure and a positive pressure respectively to the cylinder. The matching method between the positive and negative pressure and the scavenging and exhausting time is called "exhausting tuning." The preferred relation among the aforesaid stages is that when the piston is nearing the bottom dead point, and during the scavenging ports being opened, the exhausting port should be under the negative pressure state; during the period from the scavenging ports being closed to the moment of the exhausting port being closed, the exhausting port is under positive pressure state. The transmission speed (at sound speed) of the pressure wave has no relation with the RPM of the engine; consequently, the pressure wave of the exhausted gas can, after the size of the exhausting pipe being set, furnish a tuning effect only within a given RPM range the engine. Whenever the engine running at other speeds, there will be no tuning; instead, an adverse effect will be generated; for example, an early pressure wave may hinder the negative pressure, and lower the exchanging ratio of the gas. A late pressure wave may cause the fresh air to leak and to reduce the volumetric efficiency of the cylinder.

In view of the aforesaid problem of the fresh air leaking during the scavenging stage of the two-stroke engine, the inventor has developed a rotary valve to rotate syn-chronously with the crankshaft (either in the same rotating direction or not). The rotary valve has a slot to be aligned with two passage on the round hole seat at a given time so as to have the compressed air in the rotary valve jetted into the exhausting port or the crankcase for the purpases of blocking the fresh air from leading out and increasing the pressure of the fresh air in the cylinder, i.e. increasing the pressure of scavenging air. The exhausting efficiency of a two-stroke engine can be elevated as a result of the aforesaid valve structure.

SUMMARY OF THE INVENTION

The prime object of the present invention is to provide a jetting air stream to prevent the fresh air from leaking out. The jetting time of the air stream is synchronous with the rotation speed of the engine so as to obtain a tuning under any rotation speed of the engine without being limited by the exhausting pressure wave.

Another object of the present invention is to provide jetting air stream for increasing the pressure of the intake air of the engine, i.e. to increase the volume of air to promote the combustion for obtaining more output of horse power and lowering the pollution caused by waste gas exhausted.

A further object of the present invention is to provide a simple valve, which can rotate synchronously with the engine, and can accomplish the aforesaid air-blocking function and increasing the pressure of intake gas.

In order to fulfil the aforesaid objects, a rotary valve is mounted on the cylinder beside the exhausting port; the valve mainly includes a round pipe and a round hole seat; the round pipe has a slot, which is to be aligned with two passages furnished on the hole seat respectively upon the pipe rotating. The two passages are in communication with the exhausting port and the crankcase respectively. The compressed air in the round pipe is to be jetted through the two passages respectively into the exhausting port to prevent the fresh air from leaking out or into the crankcase to increase the air pressure in the engine. Since the round pipe and the crankshaft are mechanically coupled together for rotation, the jetting of air synchronously matches the rotation of the engine.

When the ignition taking place in the two-stroke engine, the piston is driven downwards. When the piston moves to a position to have the exhausting port opened, the waste gas in the cylinder will be exhausted automatically; then, the scvenging ports are opened to let the compressed fresh air in the crankcase enter into the cylinder for scavenging the low-pressure waste gas out of the exhausting port. When the piston passing the bottom dead point and going upwards to almost close the scavenging ports, the exhausting port still remains opening, and the slot of the rotary valve is in alignment with a passage (the passage being in communication with the exhausting port) to jet a high speed stream of air, which forms into an air screen in the exhausting port to prevent the fresh air from leaking out. when the piston is pushing upwards continuously (the rotary valve rotating simultaneously), the exhausting port is closed and simultaneously the rotary valve discontinues to jet out the air stream.

Before the piston reaching the top dead point, the slot on the rotary valve is in alignment with another passage (i.e. the passage being in communication with the crankcase), and blows out the compressed air into the crankcase. After the piston passing over the top dead point, the rotary valve stops to blow out the compressed air; then, the piston will move downwards to further compress the compressed air in the crankcase. Therefore, to elevate the intake and exhausting efficiency of a two-stroke engine.

BRIEF DESCRIPTION OF THE DRAWINGS

FIGS. 2A to 2D illustrate four different operation positions of pressent invention and the engine; FIG. 2A illustrates the piston being at the lower dead point; FIG. 2B illustrates the functioning condition of the present invention at the exhausting port after the position shown in FIG. 2A; FIG. 2C illustrates the present invention running continuously after the position shown in FIG. 2B; FIG. 2D illustrates the piston being at the upper dead point, and the present invention injecting gas into the crankcase.

DETAILED DESCRIPTION

Figure 1:
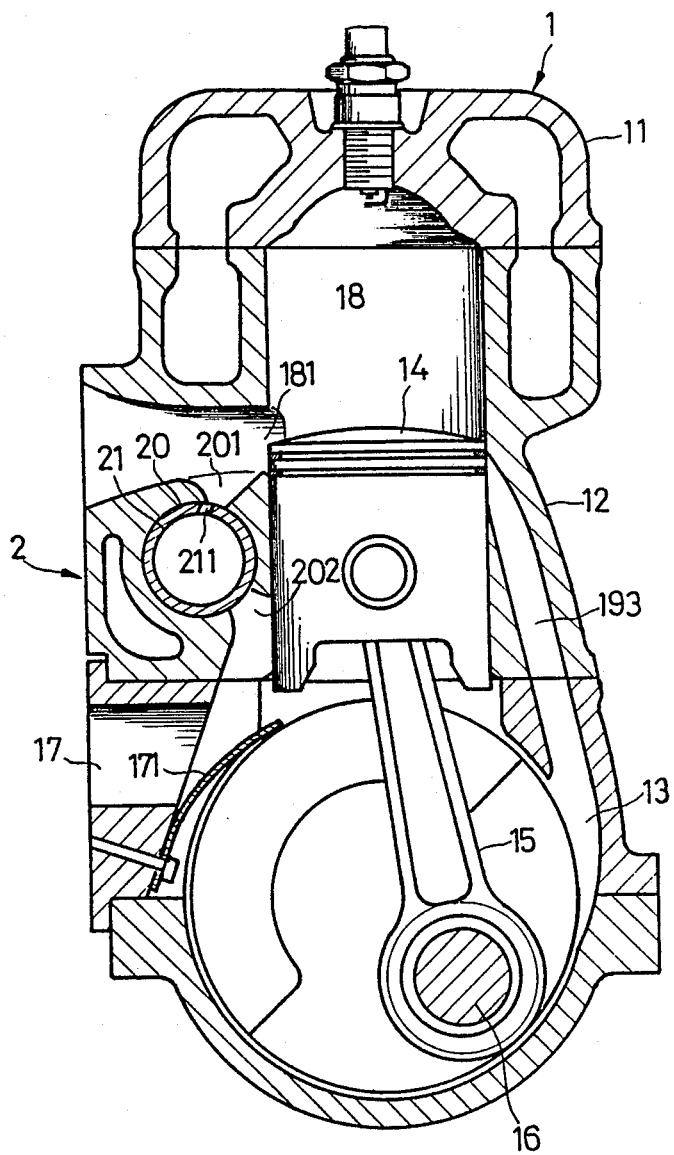
FIG. 1 is a sectional view of the present invention, being mounted on a pre-mixed type of two-stroke engine.

Referring to FIG. 1, there is shown a sectional view, illustrating the present invention being mounted on a general two-stroke engine with carburetor. The engine 1 comprises cylinder lid 11, cylinder block 12, crankcase 13; piston 14, connecting rod 15 and crankshaft 16, assembled. The crankcase 13 includes an intake port 17 closed in one way with a leaf spring valve 171, and two scavenging ports 191 and 192 (as shown in FIG. 2A) being directed to the cylinder 18 and symmetrically opposite to an exhausting port 181, and a third scavenging ports 193 opposite to the exhausting port.

It is wellknown that the carburetor (not shown) will provide a mixed gas to enter into the intake port 17 as a result of pressure difference during the piston 14 moving upward, and the leaf spring valve 171 opened by the intake gas; simultaneously, the gas above the piston 14 inside the cylinder 18 is compressed, and is ignited to burn upon the piston reaching its top dead point to generate a power to drive the piston to move downwards. In that time, the leaf spring valve 171 will be in closed condition. The gas in the crankcase 13 will be compressed by the moving down piston 14. The waste gas in the cylinder 18 will be exhausted through the opened exhausting port 181; then, the scavenging passages 191, 192, and 193 will be opened so as to let the compressed gas in the crankcase 13 enter into the cylinder 18, and to have the waste gas exhausted out through the exhausting port 181. When the piston 14 passes the bottom dead point, and moves up to almost close the scavenging passages 191, 192, and 193, the exhausting port 181 is still open. As a result of the flowing inertia of gas scavenged and exhausted, and as the piston 14 moving upwards, the space of the cylinder becomes smaller; the fresh gas is susceptible to flowing out of the exhausting port 181 together with the waste gas; it causes more fuel comsumption and more exhaust pollution.

In view of the aforesaid drawbacks, the present invention is provided with jetting device of compressed air. During the last period of exhausting stage, a powerful air stream will be jetted from that jetting device towards the exhausting port 181 to form into an air screen to prohibit the fresh gas from being exhausted; simultaneously, additional air can also be blown into the cylinder 18, and after the intake stage, blown into the crankcase 13 to provide additional pressure to the intake gas. The best embodiment of that jetting device is to mount a rotary valve 2 on the cylinder block 12 adjacent to the exhausting port 181. The rotary valve includes a round pipe 21 mounted in a round hole seat 20 on the cylinder block 12. The circumference of the round hole seat 20 is furnished with a first passage 201 being in communication with the exhausting port 181 and a second passage 202 being in communication with the crankcase 13. The round pipe 21 is connected with a compressed air source (not shown); the compressed air can only be jetted out upon the slot 211 being aligned with the first passage 201 or the second passage 202 so as to have the air jetted into the exhausting port 181 or the crankcase 13 respectively; in other words, the compressed air is maintained within the round pipe 21 during the time the slot 211 not being aligned with the first and the second passges. The round pipe 21 and the crankshaft 16 are connected to rotated synchronously by means of conventional transmission means such as gears, belts, and chains. The related positions among the slot 211, the first passage 201 and the second passage 202 are so designed that the air-jetting will take place at the moment during the last period of exhausting of the cylinder 18 and the moment of intake step of the crankcase 13 being completed The aforesaid synchronous rotation and jetting operation are further illustrated in FIG. 2A to 2D respectively. The aforesaid Figs. show the round pipe 21 and the crankshaft 16 rotating synchronously but in opposite direction.

Figure 2A:
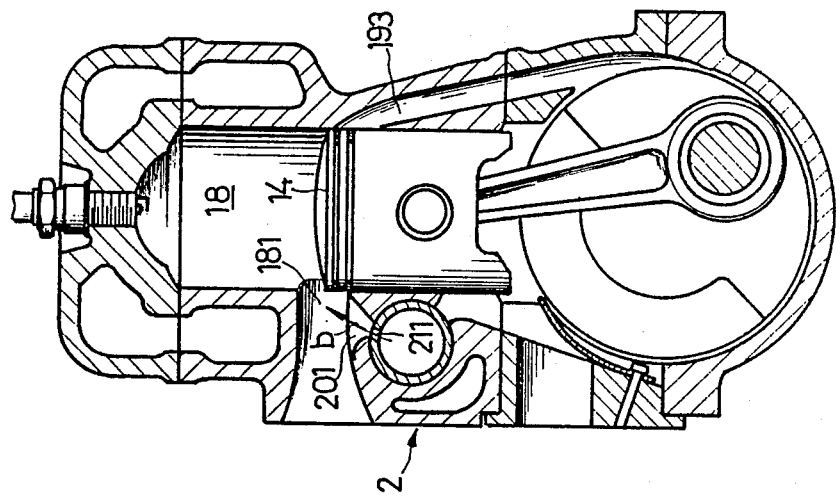

At the running moment as shown in FIG. 2A, the piston 14 is at the bottom dead point; the exhausting port 181 and the scavenging passages 191, 192 and 193 are opened. The waste gas in the cylinder 18 is largely exhausted through the exhausting port 181; at this time, the slot 211 is going to align with the first passage 201.

Figure 2B:
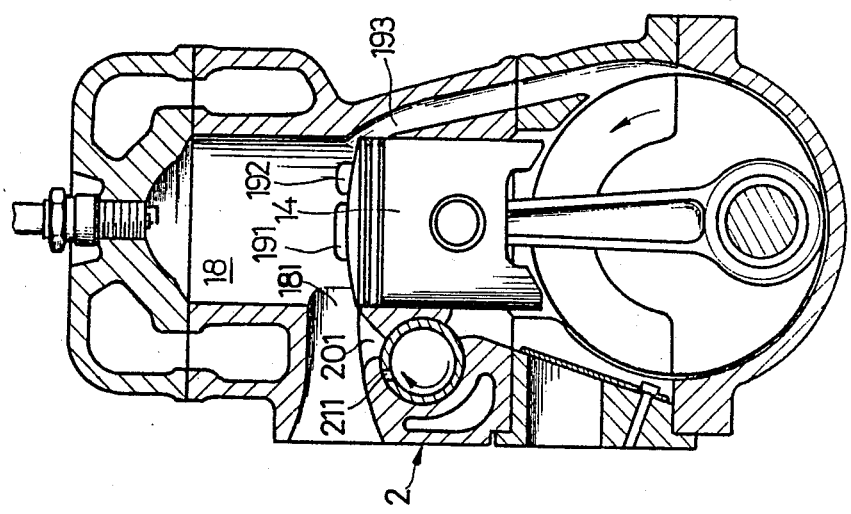

The piston 14 is then moving upwards as shown in FIG. 2B. and the scavenging passages 191, 192 and 193 have been closed, but the exhausting port 181 remains open; at this time, the slot 211 is aligned with the first passage 201 so as to jet air into the exhausting port 181 as indicated by arrow b and to block the fresh gas from flowing out of the exhausting port 181; on the contrary, fresh air will flow into the cylinder 18 to increase the gas pressure in the cylinder so as to promote a complete combustion for increasing the output forsepower and lowering the air pollution cused by exhausted gas.

Of course, the strength of the jetting air is dependent upon the cross area of the slot 211 and the pressure of the compressed air source; however, the strength of the jetting air should be higher than that of gas to be flowed out of the cylinder. The air-jetting period is to be determined by the time of the slot 211 moving across the first passage 201, and that period should be corresponding to the period from the ending of the scavenging to the moment of closing the exhausting port 181. All the aforesaid factors should be designed properly so as to obtain the best result. Generally, the compressed air source may be set at a constant pressure, or may be adjusted in accordance with the rotation speed of the engine; for example, its pressure will be increased upon the engine rotating at a higher speed, or will be decreased upon the engine rotating at a lower speed. The compressed air source can be obtained with a conventional method, and therefore the details thereof is not described herein.

Part of the air stream jetting towards the exhausting port 181 will remain out of the exhausting port 181 after the port 181 being closed. That part of remained jetting air will cause the incomplete-burned gas in the high-temperature waste gas out of the exhausting port to oxidize into carbon dioxide ($CO_2$) and aqueous vapor during the initial period of the next exhausting stroke; the aforesaid remained air is helpful in reducing the pollution caused by the exhausted gas.

FIG. 2C illustrates the rotary valve 2 being closed after the air jetting being ended. The piston 14 closes the exhausting port 181, and goes upwards to compress the gas in the cylinder 18; simultaneously, the volumetiric capacity in the crankcase 13 is increased, and gas is entering therein through the intake port 17.

FIG. 2D illustrates the piston 14 reaching the top dead point, and the explosion stroke takes place in the cylinder 18; simultaneously, the volumetric capacity of the crankcase 13 has been increased to the maximum, and the intake of gas will be stopped soon; the slot 211 is aligned with the second passage 202. The compressed air will be jetted into the crankcase 13 as indicated by arrow d so as to increase the gas pressure in the crankcase and to elevate the intake (scavenging) efficiency into the cylinder 18 later. Of course, the volume of the jetted air and the jetting time may be controlled in accordance with the factors, such as the cross area of the slot 211, the differential pressure between the compressed air source and the crankcase, and time period of the slot 211 being aligned with the second passage 202.

After the operation as shown in FIG. 2D, the piston 14 will be pushed downwards by the power generated during the explosion stage, and the exhausting step takes place till the stage as shown in FIG. 2A; then, the stages repeat.

The aforesaid description of the present invention is based on a two-stroke engine fed with a pre-mixed fuel gas. In fact, the present invention may be used in any type of two-stroke engine, including that engine with a fuel-injection nozzle inside the cylinder, and a crankcase for taking and scavenging pure air. The present invention is particularly adaptable to the fuel-injection type of engine because of being easy to control the fuel/air ratio of the gas. By means of pressure-increasing effect of the intake air according to the present invention, the engine efficiency can reach its maximum.

Figure 3:
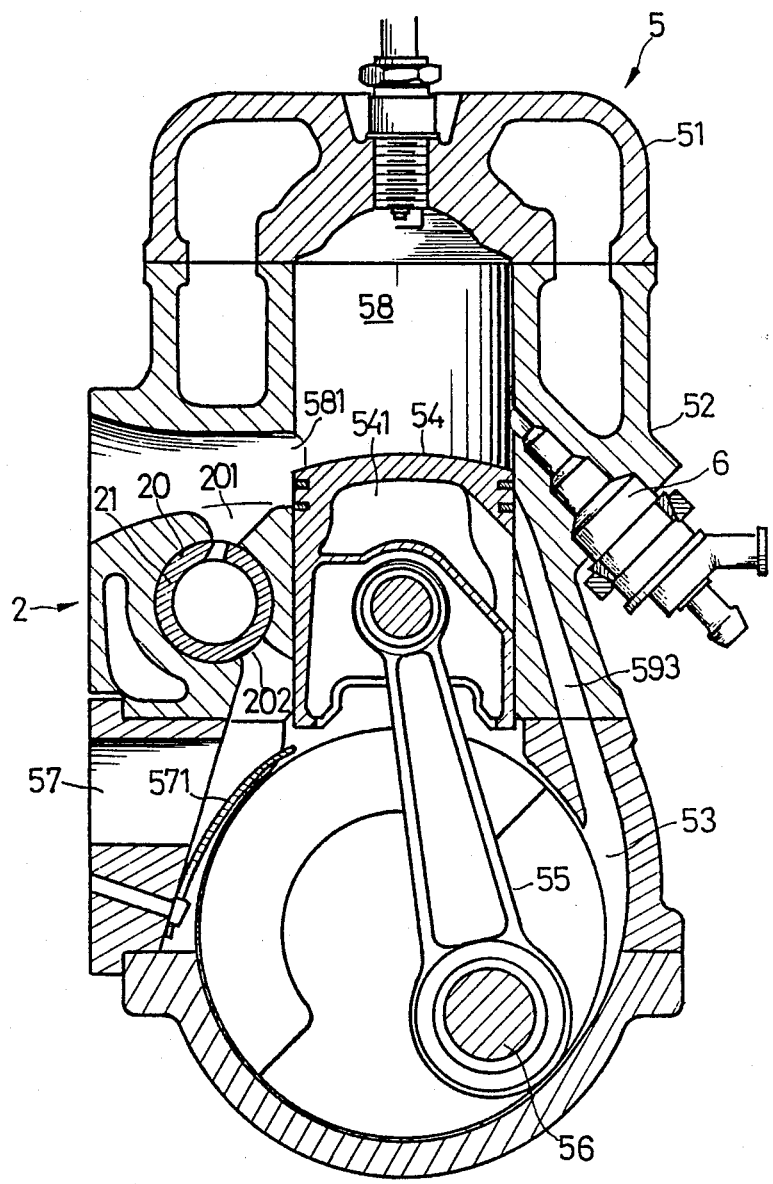
FIG. 3 is a sectional view showing the present invention being mounted on a fuel-injection type of two-stroke engine.

FIG. 3 illustrates a sectional view showing the rotary valve of the present invention being used in a two-stroke engine 5 with a fuel nozzle mounted in the cylinder. The engine 5 has almost the same structure as that shown in FIG. 1, i.e., the engine 5 comprises cylinder lid 51, cylinder block 52, crankcase 53, piston 54, connecting rod 55, crankshaft 56, intake port 57, leaf spring valve 571, cylinder 58, exhausting port 581, and scavenging passages 591, 592 (not shown) and 593. The fuel of that engine 5 is fed with a fuel nozzle 6, of which the best design is the one that has been disclosed in U.S. Pat. No. 4,708,100 by the same inventor. As shown in FIG. 3, the piston 54 has a gasifying chamber 541, which is opened towards the third scavenging passage 593 and the fuel nozzle 6. After the fuel spraying into the gasifying chamber 541, the fuel would absorb the high temperature heat of the piston to convert into gas to store in the third scavenging passage 593 temporarily, and then the gas will be scavenged into the cylinder. What to be entered into the crankcase 53, and to be compressed is pure air. The aforesaid design can lower the temperature of the piston, and can make it possible to elevate the combustion efficiency of the engine. (Since the engine temperature will be increased whenever its combustion efficiency being elevated; generally, the conventional piston has a bad heat radiation efficiency. The high temperature might cause it to be melted.) Therefore, that design and the present invention can have a reciprocal action. The rotary valve 2 includes a round hole seat 20, a first passage 201, a second passage 202, a round pipe 21, and a slot 211. The operation relation between the rotary valve and the piston 54 is the same as what described in FIGS. 2A to 2D.

The aforesaid Figures illustrate a single cylinder; however, the present invention may be used for an engine with a plurality of cylinders; in that case, the round pipe 21 is to be mounted through a given number of cylinders and furnished with a plurality of slots 211 so as to fit each first and second passages 201 and 202 of each cylinder during operation.

I claim:

1. An air-injection device being used in a two-stroke engine so as to provide an air screen during the last period of exhausting to prevent fresh gas from flowing out of an exhausting port; said engine having a piston reciprocally move in a cylinder; the wall of said cylinder being furnished with the exhausting port and a plurality of scavenging passages being in communication with a crankcase of said engine; and a valve on an intake port for gas to feed into said crankcase; said air-injection device comprising:

a cylindrical hole furnished in the cylinder block in the vicinity of said exhausting port, and having a first passage being in communication with said exhausting port;

a round pipe being rotatably mounted in said cylindrical hole, and the circumferential surface of said round pipe being provided with a slot to be aligned with said first passage upon rotation to a certain position, and said round pipe having an inlet, and the remaining part of said round pipe being closed completely;

a compressed air source being connected with said inlet for providing a compressed air at a suitable pressure; and a transmission means for linking the crankshaft of said engine and said round pipe to run synchronously so as to let the moment when said slot being aligned with said first passage correspond with the time period from the end of the scavenging stage to the closing of said exhausting port.

2. An air-injection device as claimed in claim 1, wherein said cylindrical hole has a second passage being in communication with said crankcase; and when said round pipe is rotated to another position, said slot and said second passage are aligned with each other, and the time of said alignment corresponding with the ending moment of air feeding into said crankcase through said intake port so as to increase the pressure of the gas fed into said crankcase.

* * * * *